United States Patent [19]
Pöttgens
[11] Patent Number: 4,526,049
[45] Date of Patent: Jul. 2, 1985

[54] VIBRATOR

[75] Inventor: Anton Pöttgens, Aachen, Fed. Rep. of Germany
[73] Assignee: Jean Netter, Wiesbaden, Fed. Rep. of Germany

[21] Appl. No.: 346,446
[22] Filed: Feb. 8, 1982
[30] Foreign Application Priority Data
Feb. 26, 1981 [DE] Fed. Rep. of Germany ....... 3107238
[51] Int. Cl.³ ........................ B01F 11/00; F16H 33/00
[52] U.S. Cl. ........................................ 74/87; 366/123
[58] Field of Search .................... 366/123, 128; 74/87; 166/177

[56] References Cited

U.S. PATENT DOCUMENTS

| | | | |
|---|---|---|---|
| 2,204,472 | 6/1940 | Caquot | 259/1 |
| 2,278,839 | 4/1942 | Douglass | 259/1 |
| 2,309,033 | 1/1943 | Baily | 366/123 |
| 2,546,806 | 3/1951 | Wenander | 74/87 |
| 2,829,529 | 4/1958 | Fleming | 74/87 |
| 2,876,647 | 3/1959 | Petrin | 74/87 |
| 3,283,598 | 11/1966 | Barnes | 74/87 |
| 3,340,742 | 9/1967 | Chandler | 366/123 |
| 3,727,890 | 4/1973 | Seidl et al. | 366/123 |
| 4,262,549 | 4/1981 | Schwellenbach | 74/87 |
| 4,389,120 | 6/1983 | Wadensten | 74/87 |

FOREIGN PATENT DOCUMENTS 799982 8/1955 United Kingdom .

*Primary Examiner*—Lawrence J. Staab
*Attorney, Agent, or Firm*—Biebel, French & Nauman

[57] ABSTRACT

The invention provides a vibrator for shaking materials, comprising a drive, a shaft which can be connected to the drive and which is supported on the casing, at least by a bearing, and further comprising an imbalance member supported by the shaft, in the form of an inert mass arranged eccentrically of the shaft.

As a means of improving a vibrator of this type to make it easier to mount, the invention provides that the imbalance member (10) should be arranged loose on the shaft (5). It is desirable for the imbalance member (10) to be provided in contact with the shaft (5) and at least partly enclosing it. If the imbalance member (10) is semi-cylindrical and has bearing boxes (12) at both ends, in accordance with a further embodiment of the invention, the bearing boxes will be light compared to the inert mass of the imbalance member, and their only function will be to surround the shaft and provide a contact surface or contact line. When the vibrator is starting up there is slight friction along this line, whereby the imbalance member is set slightly in rotation. This also enables lighter bearings to be used.

2 Claims, 2 Drawing Figures

VIBRATOR

BACKGROUND OF THE INVENTION

The invention concerns a vibrator for shaking materials, comprising a drive, a shaft which can be connected to the drive and which is supported on the casing, at least by a bearing, and further comprising an imbalance member supported by the shaft, in the form of an inert mass arranged eccentrically of the shaft.

There are a wide variety of vibrators of this description, some of which are used e.g. on containers, to empty them or to vibrate machine components such as conveying means and the like, as a means of keeping flowable materials able to flow. Such vibrators are particularly desirable when bulk materials are being conveyed.

Another application of the above-mentioned known vibrators is in compacting building materials, particularly concrete. In this field vibrators with a tubular casing are known, in which an electric motor and an adjacent imbalance member are arranged, mounted in the casing at both sides. The shaft carrying the imbalance member and the rotor of the electric motor are often the same part, although connections in the drive are also known. These vibrators, which are also known as vibrating bottles or internal vibrators, need to be well mounted. Bearings are liable to wear and have to be exchanged at set intervals. The mounting process involved is an intricate one.

A common feature of all vibrators with imbalance is that an eccentric or an imbalance member is seated on the shaft rotated by the drive, and is generally connected to the shaft by a force. The known imbalance member may be connected to the shaft by a force, e.g. through welding, screwing, clamping or even moulding it onto the shaft. The centrifugal force which results from rotation of the imbalance member is transmitted by bearings to the casing, so that this vibrates the materials in the desired manner.

The mounting of the bearings for the shaft unfortunately involves stoppages, which are serious particularly because the bearings, which wear out relatively quickly and the inner ring of which is fitted securely onto the shaft, can only be removed with difficulty. For this purpose pulling off devices are used in the known case but are difficult to insert between the imbalance and the bearing. Only if this is done, however, can the bearing be successfully dismantled and exchanged, particularly if the pulling off device also engages the inner ring of the bearing.

The invention therefore aims to improve the vibrator of the above type so as to make it easier to mount.

SUMMARY OF THE INVENTION

According to the invention, this is achieved by having the imbalance member arranged loose on the shaft. Whereas in the past it was always taken for granted that an eccentric or an imbalance member can only be successfully set in rotation by a shaft if the known imbalance member is fixed to the shaft as described above, the inventor has taken a different approach and constructed the coupling between the shaft and the imbalance member as a type of loose suspension. In contrast with known vibrators, the imbalance member of the invention is no longer connected to the drive shaft by a force. When the vibrator according to the invention is inoperative, one can imagine there to be contact between the imbalance member and the shaft without the above-mentioned connection. When the arrangement is started up, therefore, or when the shaft begins to turn, the imbalance initially lags behind the periphery of the shaft like an inert body. The above-mentioned contact is the prerequisite for the initially slight friction between the two parts: the shaft and the imbalance member. As the rotary speed of the shaft increases, however, the friction becomes greater and the imbalance is accelerated. It has been found in practice that, although the imbalance member is arranged loose on the shaft, the desired vibrating action can in fact be obtained. The bearing to be replaced can advantageously be pulled off the shaft together with the loose imbalance member.

This advantage is experienced with all types of vibrators, whether they are driven electrically, pneumatically, hydraulically or in any other way. The advantage is experienced not only with vibrators where the shaft is a component of the motor, e.g. as in internal vibrators for compacting concrete. There is an equal advantage with vibrators where the shaft is connected to the drive by a rigid or flexible coupling, where a flexible shaft is interposed, (or) where larger or smaller spaces are left between the drive and the shaft with the imbalance member.

In an advantageous further embodiment of the invention, the imbalance member is provided in contact with the shaft and at least partially surrounding it. The imbalance may be held, e.g. by a component which surrounds the shaft in the center or any other appropriate longitudinal position, so that a high imbalance—and thus a good vibrating action—is achieved, although the imbalance member is held quite satisfactorily by the shaft.

In what is regarded here as a specially preferred embodiment, the vibrator is further characterised in that the imbalance member is semi-cylindrical and has bearing boxes at both ends. These are light compared to the inert mass of the imbalance member, and their function is merely to surround the shaft and provide a contact area of contact line. When the vibrator according to the invention is starting up there is slight friction along this line, whereby the imbalance member is set slightly in rotation. This creates centrifugal forces, which bear on the imbalance member at the side opposite the greater mass, i.e. at the location of the bearing boxes or of the components surrounding the shaft, and which entrain the imbalance member until its rotary speed and that of the shaft are synchronous in any other position of the imbalance on the shaft. The friction between the surfaces of the bearing boxes which are in contact with the shaft and the shaft itself is in fact gradually strengthened as the rotary speed rises, because the centrifugal force increases exponentially with the rotary speed.

However, it is not only the components surrounding the shaft and not only the bearing boxes which create the friction between the shaft and the imbalance member, to entrain the imbalance member when the shaft rotates: friction takes place generally between the rotating parts on the the one hand and the imbalance member on the other. Apart from the shaft, which turns in operation, the inner bearing ring is also in rotation, to give only one example, and according to the arrangement and position of the vibrator, other parts may be in frictional contact with one another through touching and canting and through the direction of their weight. This is explained if one considers emptying vibrators on the one hand and vibrating bottles for compacting concrete on the other, where different positions are necessary in each case. It is known that the vibrating bottle is suspended vertically into the concrete.

In the preferred embodiments described above, the loose arrangement of the imbalance on the shaft is virtually the engagement of the bearing boxes around the imbalance via the shaft, or the placing of the imbalance, with the bearing boxes at both ends, on the shaft. The bearing boxes or other components surrounding the shaft are seated on it with a certain fit. In other words, there is a relatively small clearance between the shaft and the bearing box.

To take a special example of a vibrator with a shaft diameter of approximately 20 mm, where the shaft can be driven at approximately 200 revolutions per second, the above-mentioned clearance between the shaft and the bearing box at the maximum position will be approximately 1/10 mm.

Other advantages, features and applications of the invention will emerge from the description of a preferred example which follows. This refers to the accompanying drawings, in which:

DESCRIPTION OF THE PREFERRED EMBODIMENTS

Figures 1, 2:
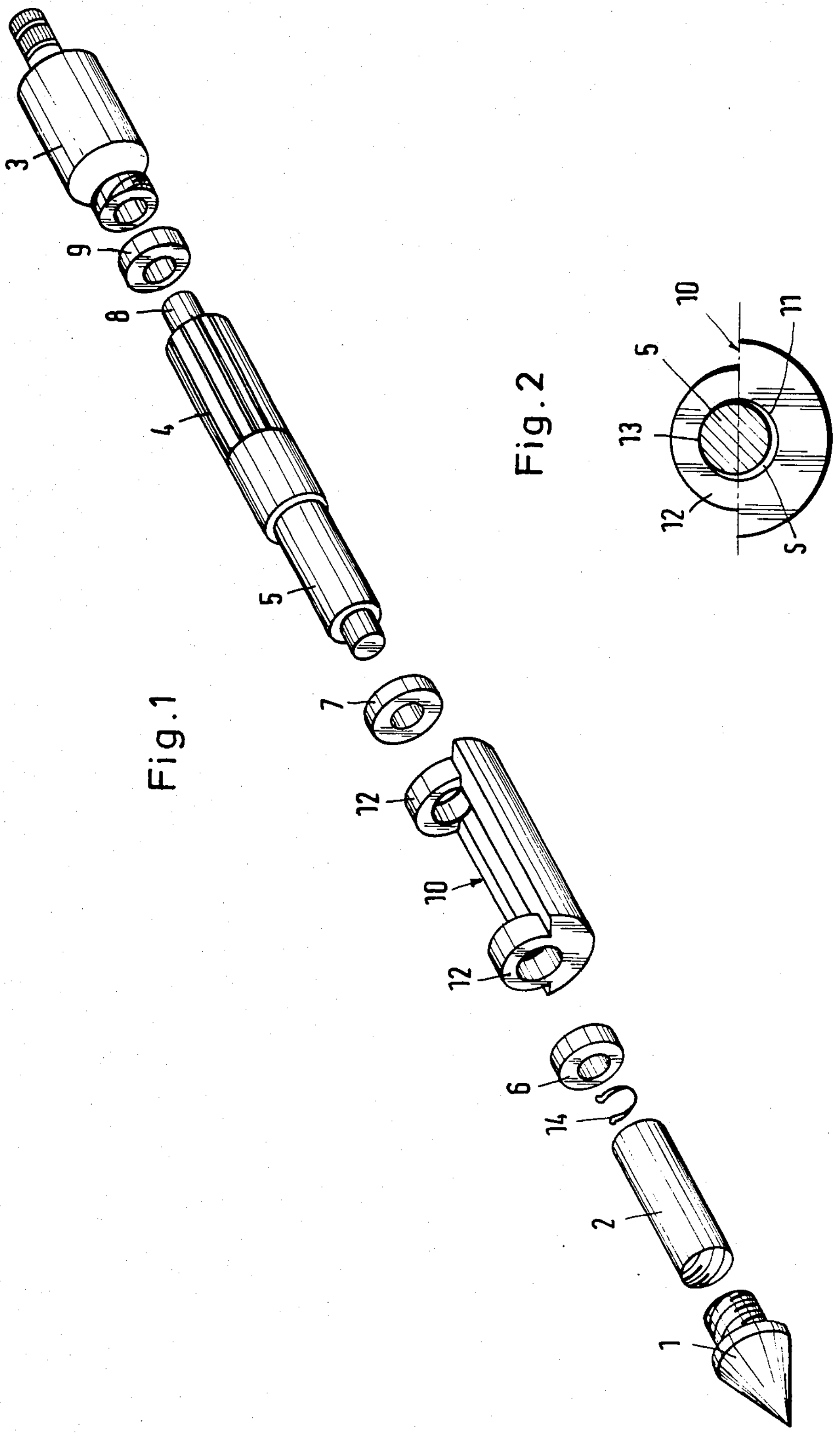
FIG. 1 is an exploded view of the vibrator for internally compacting concrete, with the imbalance member according to the invention.
FIG. 2 is a sectional view through the assembled vibrator in front of the imbalance member, with the shaft cut and the imbalance member seen in plan.

In the vibrator shown in FIG. 1, for internally compacting concrete, the left end is in known manner a tip 1 which is fixed to the casing 2. At the opposite, right hand side of FIG. 1 the stator 3 can be seen; its external surface comes snug into contact with that of the casing 2 when the components of the FIG. 1 vibrator are assembled. The rotor 4, which is integral with the shaft 5, is located inside the casing 2 and stator 3 after assembly. The shaft 5 is supported against the casing 2 by two bearings 6 and 7, while the right hand end 8 of the rotor 4 is supported against the stator 3 by a further bearing 9. The imbalance member, shown generally at 10 is arranged loosely on the shaft 5 between the bearings 6 and 7.

The plan and sectional view in FIG. 2 shows how the imbalance member 10 is placed on the shaft 5. The clearance S shown is exaggerated to demonstrate.

The imbalance is in the form of a semi-cylindrical body, where the cylinder should be thought of as being bisected at its longitudinal axis. In addition, the semi-cylinder has a longitudinally extending, trough-shaped recess 11 containing the lower half of the shaft (FIG. 2). In the perspective view in FIG. 1 the upper half of the shaft is free and is enclosed only by the bearing boxes 12 located at both ends of the imbalance member 10. It will be appreciated that, when the vibrator illustrated is arranged horizontally, there is contact between the shaft 5 and the imbalance member 10 along two short lines, along which the imbalance member rests against the shaft 5 by way of the bearing boxes 12. This place is shown at 13 in FIG. 2.

When the vibrator is operated, one can imagine that, as the shaft side begins to turn, the imbalance member 10 will initially be set only slightly in motion by the contact at the point 13, but that this will create centrifugal forces which will increase the friction at the point 13, thus causing the imbalance member 10 to be carried along more vigorously as the shaft 5 rotates. The centrifugal force, which increases exponentially with the rotary speed, thereby further increases the friction, until the rotary speed of the shaft 5 and imbalance member 10 is eventually synchronous.

This description disregards the fact that other turning parts exert frictional acceleration on the imbalance member 10, e.g. the inert bearing ring.

The function of the retaining ring 14 is to hold together the mounted components within the casing member 1 to 3.

I claim:

1. A vibrator for shaking materials, such as concrete or the like, comprising:
- a casing,
- a drive shaft,
- means rotatably mounting said drive shaft in said casing,
- drive means for rotating said drive shaft, and
- an imbalance member exclusively supported by said drive shaft in said casing, said imbalanced member comprising an inert mass arranged substantially eccentrically of and loose on said drive shaft, and having a portion at least partially surrounding said drive shaft whereby rotation of said drive shaft imparts concurrent rotation of said imbalance member therewith by frictional coupling therebetween, and in which said portion comprises a pair of spaced-apart bearing boxes positiond at the remote ends thereof, said bearing boxes being formed in encircling relation to said drive shaft and defining a clearance fit with said shaft.

2. A vibrator for shaking materials, such as concrete or the like, comprising:
- a casing,
- a drive shaft in said casing,
- an imbalance member of axially elongated semi-cylindrical shape and being exclusively supported by said drive shaft in said casing, said imbalance member having a pair of spaced-apart bearing boxes positioned at the remote ends thereof, said bearing boxes being formed in encircling relation to said drive shaft and forming a clearance fit with said shaft, with a major portion of said imbalance member being positioned eccentrically of said shaft whereby rotation of said shaft imparts concurrent rotation of said imbalance member therewith by frictional coupling therebetween.

* * * * *